Patented Nov. 13, 1945

2,389,099

UNITED STATES PATENT OFFICE 2,389,099

PRODUCTION OF DIAMINO SUCCINIC ACID

Wilhelm Wenner, Upper Montclair, N. J., assignor to Hoffmann-La Roche, Inc., Roche Park, Nutley, N. J., a corporation of New Jersey No Drawing. Application November 27, 1944,
Serial No. 565,405

5 Claims. (Cl. 260—534)

My invention relates to an improved method for the preparation of meso-$\alpha,\beta$-diamino succinic acid

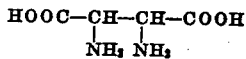

This method is an improvement over the prior art because it gives the technically important meso acid smoothly in a practically pure state and in very good yields. Prior to this invention the acid has been a difficultly accessible compound and has not been available for technical purposes.

The oldest recorded methods of synthesizing this acid are those of Lehrfeld (Ber. 1881, 14, 1816) and Neuberg et al. (Hoppe-Seyler, Zeitschrift für Physiologische Chemie, 44, 154) both of whom used $\alpha,\beta$-dibromo succinic acid as initial material, and in order to convert it into the diamino compound treated it with ammonia, Lehrfeld in alcoholic solution and Neuberg in aqueous solution. The alleged yields obtained by these methods were so small that a later investigator, on repeating the methods, was unable to obtain any meso-$\alpha,\beta$-diamino succinic acid at all (Claus, Ber., 1882, 15, 1849, as cited by Frankland, Soc., 1911-2, 99, 1775).

Tafel and co-workers (Ber. 1887, 20, 244; Ber. 1893, 26, 1982; Ber. 1905, 38, 1590); and Ziegler and co-workers (Ber. 1887, 20, 837) worked out a different approach. They converted dihydroxy tartaric acid into the diphenyl hydrazone and reduced the hydrazone to $\alpha,\beta$-diamino succinic acid with sodium amalgam. The procedure is awkward because it calls for the use of large amounts of the phenyl hydrazine. The latter is expensive and its use in large-scale experiments is avoided wherever possible on account of its unpleasant physiological properties. The use of sodium amalgam is another drawback. The above named authors report that about 30 parts of sodium amalgam are necessary for the preparation of 1 part of $\alpha,\beta$-diamino succinic acid. This excessive amount makes the expense of the procedure prohibitive. Moreover, the sodium amalgam is not practical for technical procedures as only a few hundred grams can be prepared at a time, and the technical hazards of preparing it are considerable. Both syntheses yield mixtures of racemic and meso-$\alpha,\beta$-diamino-succinic acid. If the meso-$\alpha,\beta$-diamino succinic acid, the more important isomer, is wanted, the mixtures have to be separated by fractional precipitation from acid solution (Tafel and co-workers, loc. cit., Kuhn and Zumstein, Ber. 1925, 58, 1429; Ber. 1926, 59, 479).

I have now discovered a new method for making the meso compound which is simple and technically useful and possesses some surprising features. In my new method, I use the meso-$\alpha,\beta$-bis-benzylamino succinic acid as starting material, and I submit this derivative to catalytic hydrogenation which yields the meso-$\alpha,\beta$-diamino succinic acid. Frankland, who was the first to make the meso-$\alpha,\beta$-bis-benzylamino succinic acid and to investigate its optical isomers (Soc. 1911, 99, 1775) states that it was not possible to prove directly which of the isomers has a structure analogous to that of the racemic $\alpha,\beta$-diamino succinic acid, because "the benzylamino-acids cannot be converted into the amino acids or into tartaric acids by any simple means." I have found that, nevertheless, a simple means of conversion is provided by catalytic hydrogenation of the meso-$\alpha,\beta$-bis-benzylamino succinic acid in acid solution, as it gives the meso-diamino succinic acid directly and in good yields. This discovery was all the more unexpected because hydrogenation of neither the free acid itself nor of its salts with bases will effect that result. Only solutions of the salts of meso-$\alpha,\beta$-bis-benzylamino succinic acid with mineral acids, or solutions of that meso acid in an excess of mineral acid are easily reduced, and as the product of that hydrogenation meso-$\alpha,\beta$-diamino succinic acid is obtained which at most contains only traces of the racemic diamino succinic acid.

I perform my reaction in any suitable solvent such as water or non-basic organic solvents such as methanol, ethanol, acetic acid, or mixtures thereof with water, using a noble metal, such as palladium or platinum, preferably the former, as a catalyst at temperatures preferably not exceeding 90° C. and within a wide range of pressures, including atmospheric pressure. Under the conditions described in the following examples, I obtain yields as high as 90% of meso-$\alpha,\beta$-diamino succinic acid. The procedure, therefore, is very simple and allows the large-scale production of meso-$\alpha,\beta$-diamino succinic acid without difficulties:

*Example 1*

3 parts by weight of meso-$\alpha,\beta$-bis-benzylamino succinic acid are dissolved in 50 parts by weight of hydrobromic acid 10%. The solution is hydrogenated with 1 part by weight of palladium charcoal (10% Pd) at 25° and 30 atm. pressure for 20 hours. It is then filtered and distilled to dryness. The crystalline residue is dissolved in dilute sodium hydroxide solution and filtered. The colorless filtrate is acidified with acetic acid. Meso-α,β-diamino succinic acid separates immediately. It is filtered, washed with water, and dried. Yield 1.2 parts by weight.

Example 2

5 parts by weight of meso-α,β-bis-benzylamino succinic acid and 70 parts of methanol are placed in the glassliner of an autoclave. 5 parts by weight of concentrated hydrochloric acid and 1 part by weight of palladium charcoal, containing 0.2 parts by weight of palladium, are added. The hydrogenation is carried out at 60 atm. pressure and room temperature for 16 hours. The solution is filtered from the catalyst, and the catalyst extracted with dilute hydrochloric acid. The combined filtrates are distilled to dryness in the vacuum. The residue is dissolved in a sufficient amount of dilute sodium hydroxide solution. The solution is filtered and acidified with acetic acid. Meso-α,β-diamino succinic acid separates at once. It is filtered and dried. Yield=1.5 parts by weight. M. P. 303–305°.

Example 3

150 parts by weight of meso-α,β-bis-benzylamino succinic acid, 650 parts by weight of acetic acid, 140 parts by weight of hydrochloric acid (35%) and 25 parts by weight of palladium charcoal (containing 2.5 parts by weight of palladium) are hydrogenated in a glass-lined autoclave at a pressure of 50 atm. The temperature is kept for 15 hours at 35°, for six hours at 50° to 60°, finally for 15 hours at 20°. The reaction mixture is then treated with 10% aqueous hydrochloric acid in order to dissolve the precipitated hydrochloride of the meso-α,β-diamino succinic acid at 80°. The hot solution is filtered by suction from the catalyst and the catalyst washed thoroughly with 10% hydrochloric acid. The combined filtrates are distilled to dryness in the vacuum. The residue is stirred with distilled water and cooled in a refrigerator for 20 hours. The colorless crystals are filtered by suction, washed with water, and dried. Yield: 59 parts by weight (90% of theoretical) of meso-α,β-diamino succinic acid. M. P. 305–306°.

Racemic α,β-bis-benylamino succinic acid, when hydrogenated in the same manner, yielded a mixture of the racemic and meso-α,β-diamino succinic acids consisting predominantly of the latter.

What I claim is:

1. Process for making meso-α,β-diamino succinic acid which comprises hydrogenating α,β-bis-benzylamino succinic acid in a solvent in the presence of at least two equivalents of mineral acid and of a noble metal catalyst.

2. Process for making meso-α,β-diamino succinic acid which comprises hydrogenating meso-α,β-bis-benzylamino succinic acid in a solvent in the presence of at least two equivalents of mineral acid and of a noble metal catalyst at a temperature not exceeding 90° C.

3. Process for making meso-α,β-diamino succinic acid which comprises hydrogenating meso-α,β-bis benzylamino succinic acid dissolved in aqueous hydrobromic acid containing at least two equivalents of HBr in the presence of palladium charcoal at a temperature not exceeding about 25° C. and at a pressure of about 30 atm.

4. Process for making meso-α,β-diamino succinic acid which comprises hydrogenating meso-α,β-bis-benzylamino succinic acid in methanol in the presence of at least two equivalents of HCl and of palladium charcoal at room temperature and at a pressure of about 60 atm.

5. Process for making meso-α,β-diamino succinic acid which comprises hydrogenating meso-α,β-bis-benzylamino succinic acid in acetic acid containing a small amount of water in the presence of at least two equivalents of HCl and of palladium charcoal at a temperature not exceeding about 60° C. and at a pressure of about 50 atm.

WILHELM WENNER.